United States Patent Office 3,466,422
Patented Sept. 9, 1969

3,466,422
WELDING MATERIAL FOR AUSTENITIC DUCTILE IRON
Charles E. Witherell, Pomona, N.Y., assignor to The International Nickel Company, Inc., New York, N.Y., a corporation of Delaware
Filed Nov. 21, 1966, Ser. No. 595,927
Int. Cl. B23k *35/22*
U.S. Cl. 219—146    7 Claims

ABSTRACT OF THE DISCLOSURE

Directed to a welding material for producing tough, strong welds in austenitic ductile iron castings comprising a metallic member and a flux wherein the metallic member is a malleable alloy containing about 18% to about 40% nickel and the balance essentially iron and wherein the flux comprises a mixture of powder ingredients including flux-forming and slag-forming ingredients and including, by weight, about 5% to about 20% carbon, about 1.5% to about 3.5% magnesium and up to 30% of rare earth oxides.

---

Figure 1:
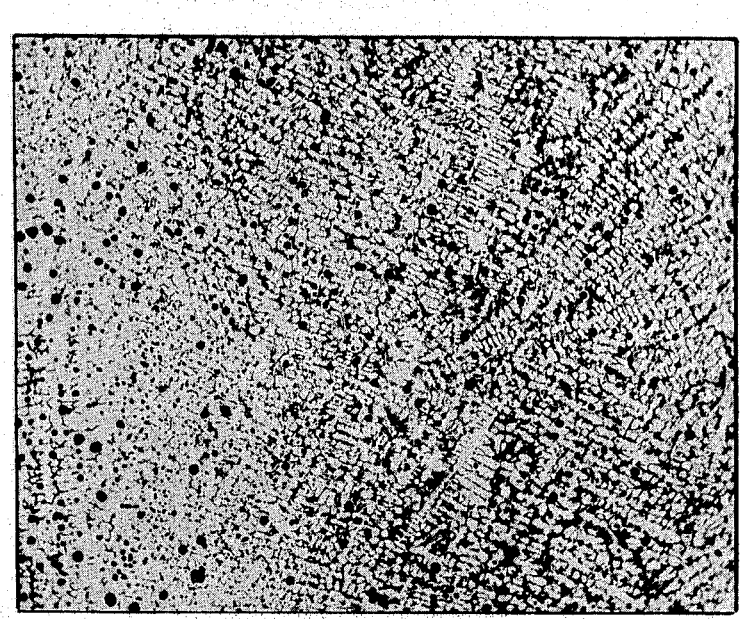

The present invention is directed to welding of nickel-containing austenitic cast iron and, more particularly, to an improved method for welding said materials wherein such welds having substantially the strength of the base material are achieved.

In recent years, the art of welding has made substantial progress and it is now possible to produce satisfactory welds in many metallic materials. However, the welding process still involves many variables which make it difficult to predict beforehand how to solve particular problems in areas in which satisfactory welding methods do not exist. One problem which is always encountered in welding is that of extremely rapid cooling rate in the weld deposit. Another problem which must always be borne in mind is that of weld heat effects in the parent metal in the zone bordering upon the weld. In cast irons, the welding problems have been especially severe due in large measure to the fact that cast irons contain substantial amounts of carbon. In ferritic cast irons, the carbon present in the base material dissolves in the weld nugget with the result that carbon effects in the weld nugget resulting in the formation of carbides, martensite, etc., present particularly difficult problems which to date have only been solved by means of special heat treatments applied both before and after the welding operation. Austenitic cast irons, such as those containing about 18% to about 36% nickel, present an entirely different array of problems insofar as welding is concerned. Experience in welding the austenitic nickel-containing cast irons has demonstrated the existence of an especially severe problem involving cracking along the welding interface. This phenomenon has been called "fusion line cracking" and it apparently involves the generation of severe weld shrinkage stresses during cooling of the weld. Welding procedures involving the use of coated electrodes are available whereby nickel-containing austenitic grades of cast iron can be welded with the production of a weld having a satisfactory degree of soundness. However, the physical properties developed in the weld by known methods are not satisfactory. In recent times following upon the discovery that certain spheroidal elements such as magnesium may be incorporated in cast iron to produce spheroidal graphite therein, it has become possible to produce cast irons having substantially improved strength and ductility. The magnesium treatment of nickel-containing austenitic cast irons provides spheroidal graphite therein and improves the strength, ductility and toughness characteristics of such materials markedly. The fact that such markedly improved mechanical properties can be produced in austenitic grades of spheroidal graphite cast iron, hereinafter called austenitic ductile iron has sharpened the need for a means whereby welds could be produced in such materials which would have substantially the same or even improved mechanical properties as compared to those of the base material. Availability of welding means which would accomplish this result would enhance the utilization of austenitic ductile iron as an engineering material since such means would permit joining together of cast parts made of an austenitic ductile iron and would also permit joining of austenitic ductile iron parts to parts made of other materials. The ability to provide structural and repair welds having satisfactory properties in such materials would expand the utility thereof in many applications where the strength and corrosion resistance of the materials is attractive. Thus, a satisfactory welding procedure would permit the production of smaller and less complex castings which could be welded into complex integral form, would permit the production of weldments which could not be fabricated as an integral casting because of foundry problems and would permit the utilization of lighter cast sections since it would not be necessary to provide for inferior weld properties in a weldment. As described in A.S.T.M. Specification A439–62, austenitic ductile iron castings contain about 18% to 36% nickel, not more than about 3% carbon about 1% to about 6% silicon, up to about 1.25% manganese, not more than about 0.08% phosphorus, up to about 5.5% chromium, and the balance essentially iron. Various grades of the material may be specified. The sulfur content of the castings is low, usually not exceeding 0.02%. Another commercial grade of the material which is useful for low-temperature applications contains about 3.75% to 4.5% manganese, about 21% to 24% nickel, about 1.5% to 2.6% silicon, not more than about 2.7% carbon, not more than 0.5% chromium, with the balance essentially iron.

A welding procedure has now been discovered which enables the production in austenitic ductile iron of welded joints having mechanical properties substantially matching those of the base material.

It is an object of the present invention to provide a means for welding austenitic ductile iron to produce welds having mechanical properties substantially matching those of the base material.

It is a further object of the invention to provide welding materials which may be employed in conventional arc welding procedures to produce welds of markedly improved quality in austenitic ductile iron.

It is another object of the invention to provide a special electrode for welding austenitic ductile iron to produce sound welds having high strength, ductility and toughness.

Figure 2:
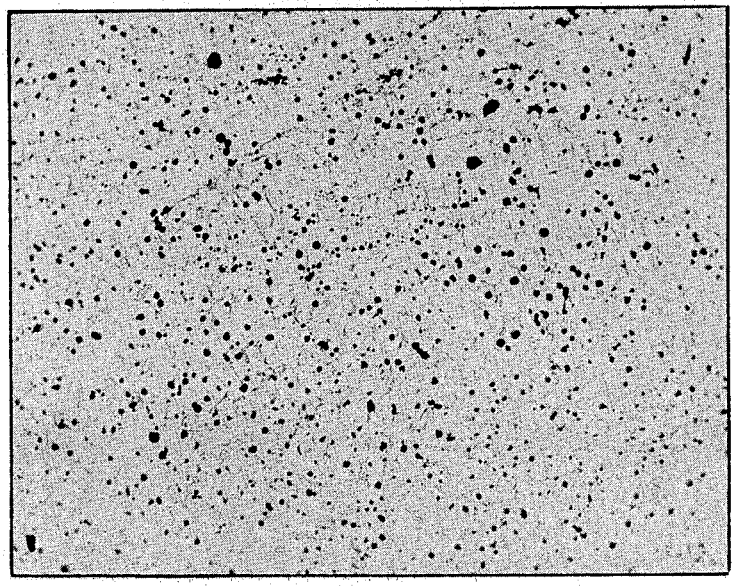

Other objects and advantages of the invention will become apparent from the following description taken in conjunction with the accompanying drawing in which:

FIGURE 1 is a reproduction of a photomicrograph taken at 100 diameters depicting the structure of an as-welded deposit produced in accordance with the invention, and FIGURE 2 is a reproduction of a photomicrograph taken at 100 diameters of the same material illustrated in FIGURE 1 after an anneal.

Broadly stated, the present invention comprises the production of strong welds in austenitic ductile iron containing about 18% to about 36% nickel comprising producing a shielded-arc weld metal pool consisting essentially of iron and nickel in the amount of about 18% to about 38%, or even 40%, nickel, by weight, feeding into said pool carbon amounting to, by weight, about 0.5% to about 3.5%, and introducing magnesium into said pool to cause occurrence of spheroidal graphite in solidified metal from said pool. In a special embodiment of the invention, a stick electrode, i.e., a flux-coated or flux-cored electrode, is provided having a current-conducting element made of an iron alloy containing about 18% to about 38%, or even 40%, nickel, up to about 2.5% manganese, up to about 5.5% chromium, up to about 1% silicon, up to about 5% copper, up to about 0.2% carbon, up to about 0.1% calcium, not more than about 0.02% each of phosphorus and sulfur, and the balance essentially iron, and a flux mixture comprising flux-forming and slag-forming ingredients, said flux containing about 5% to about 20% carbon and about 1.5% to about 4.5% magnesium. Preferably, the electrode core wire composition will fall within the ranges, in weight percent, in the following Table I and the flux coating composition will be as provided in the following Table II.

TABLE I

| Element | Preferred composition, percent | Preferred range, percent |
| --- | --- | --- |
| Iron | Balance | Balance. |
| Nickel | 20 | 19–22. |
| Manganese | 0.2 | 0.15–0.3. |
| Silicon | 0.1 | Up to about 0.2. |
| Carbon | 0.05 | Up to about 0.1. |
| Calcium | 0.02 | |
| Phosphorus | Low | Low. |
| Sulfur | Low | Low. |

TABLE II

| Constituent | Preferred composition, percent | Permissible limits, percent |
| --- | --- | --- |
| Calcium carbonate | 44 | 30 to 70. |
| Cryolite 3NaF·AlF₃ | | Up to 30. |
| Calcium fluoride | 23 | Up to 40. |
| Carbon | 10 | 5 to 20. |
| Nickel-15% magnesium alloy | 20 | 10 to 30. |
| Bentonite (colloidal clay) | 3 | 2 to 5. |
| Rare earth oxides | | Up to 30. |

NOTE.—To the blended dry ingredients about 10% to about 20%, by weight, of a sodium silicate solution and, preferably, about 15%, of sodium silicate solution is added together with water sufficient to provide an extrudable consistency. At least 5%, by weight, of the dry flux composition is a fluoride ingredient, e.g., cryolite, calcium fluoride, etc.

The flux coating may be applied to the core wire by extrusion after which the coating is baked by slowly heating the coated electrodes over the temperature range of about 200° F. to about 600° F. and holding at about 600° F. for about two hours. It will be appreciated that metallic ingredients such as nickel powder and iron powder of low gas contents, chromium or ferrochromium powder, copper powder, manganese or ferromanganese powder, etc., may be included in the flux composition providing that the total metal content of the flux coating does not exceed about 80 parts by weight. When this embodiment is employed, the conductive portion of the electrode may be made of mild steel. It is preferred, however, to employ a nickel alloyed iron as the conductive portion of the stick electrode, with only minor proportions of nickel and other alloying ingredients such as chromium, manganese, etc., being introduced by way of the flux. Carbon and magnesium are introduced through the flux since only minor amounts of these elements can be included in the metallic conductive portion, e.g., core, of the electrode in the interests of malleability. The coated electrodes will have coatings amounting to about 20% to about 40%, by weight, of the total electrode. Advantageously, flux coating thicknesses for various electrode core wire diameters are given in the following Table III.

TABLE III

| Electrode core wire diameter, inches: | Coating outside diameter, inches |
| --- | --- |
| ³⁄₃₂ | 0.130 |
| ⅛ | 0.180 |
| ⁵⁄₃₂ | 0.220 |
| ³⁄₁₆ | 0.260 |

The objective of the invention is to provide in or on austenitic ductile iron castings containing about 18% to about 36% nickel a weld deposit having controlled composition. For purposes of the invention, the compositions of the weld deposits are controlled as set forth in the following Table IV.

TABLE IV

| Element | Preferred composition, percent | Preferred broad range, percent | Permissible limits, percent |
| --- | --- | --- | --- |
| Iron | Balance | Balance | |
| Nickel | 20 | 18 to 22 | 18 to 40. |
| Manganese | 0.2 | 0.1 to 0.3 | Up to about 2.5. |
| Chromium | | | Up to about 5.5. |
| Silicon | 0.2 | 0.1 to 0.6 | Up to about 1.0. |
| Copper | | | Up to about 5.0. |
| Carbon | 2.0 | 1.0 to 2.5 | 0.5 to 3.5. |
| Calcium | | | 0.1 max. |
| Phosphorus | Low | 0.02 max | 0.05 max. |
| Sulfur | Low | 0.015 max | 0.035 max. |
| Magnesium | 0.01 | 0.005 to 0.02 | Up to about 0.05. |

In order to prevent fusion line cracking, the nickel content of the weld deposit should substantially match that of the austenitic ductile iron being welded. Manganese may be present in the weld deposit in amounts up to about 2.5%, although for most purposes it is preferred to control the manganese content of the weld to the lower levels set forth in Table IV. Phosphorus and sulfur in the weld deposit are harmful and can cause cracking and, accordingly, these impurity elements should be kept as low as possible. Magnesium in the weld deposit causes the occurrence of spheroidal graphite therein and, accordingly, sufficient magnesium should be introduced into the weld metal pool to accomplish this end. However, the magnesium content of the weld metal should not exceed about 0.05% as otherwise weld cracking is encountered. It is found that no deliberate additions of silicon need be made for graphite inoculation purposes in the weld. Instead, the silicon which appears in the weld metal is derived from the small amounts which may be present in the core wire and some silicon derived by reduction of the silicate binder used in the flux.

It will be appreciated that the electrode can be produced as a flux-cored material rather than a flux-coated material. This is simply accomplished by enfolding the dry powdered flux ingredients within a metal tube and drawing the tube to a smaller diameter. When this practice is employed, there is no necessity to add extrudability aids or binder to the flux mixture. In this connection, it will be appreciated that in the flux-coated or flux-cored electrodes, the principal contribution of the alkaline earth carbonate and fluoride constituents is to provide a shielding gaseous atmosphere which is principally carbon dioxide and to provide a slag covering over the weld metal pool behind the advancing electrode so as to prevent contamination of the weld metal pool by the atmosphere. When the flux-cored material described hereinbefore is employed, the silicate binder and colloidal clay additions which are used in coated electrodes for binding the coating and as an extrudability aid, respectively, may be omitted since the flux ingredients are mechanically fixed in position in the flux-cored stick electrode. In addition, if desired, the flux-forming and slag-forming alkaline earth metal fluorides and carbonates can be omitted from the core material and the electrode can be used with any of the usual shielding gases or gas mixtures employed in metal-arc and tungsten-arc welding. Thus, gases such as argon, helium, carbon dioxide, etc., with or without usual supplemental ionizing gases such as oxygen, etc., can then be employed. In either embodiment, powdered materials comprising the flux have particle sizes in the range of about 50 to about 300 microns.

It is to be appreciated that the function of rare earth metal oxides in the flux composition is to provide arc stabilization. These materials do not serve as graphite spheroidizing ingredients in accordance with the invention.

Magnesium, which is an essential constituent of the flux composition, is conveniently introduced therein as a nickel-magnesium alloy containing about 2% to about 50%, e.g., about 15% magnesium. Copper-magnesium and cerium-magnesium alloys containing about 25% to about 50% magnesium may also be employed, as may agglomerated magnesium powder mixes with ingredients such as carbon, nickel, chromium, iron, etc. The flux-forming and slag-forming ingredients in the flux not only generate a protective atmosphere in the arc and protect the weld but assist in transferring magnesium across the arc despite the fact that arc temperatures far exceed the boiling temperature of magnesium. Stick electrodes produced according to the invention have good operability and can be employed in vertical and overhead positions.

Welds produced in accordance with the invention have substantial strength and ductility in the as-deposited condition as well as a surprising toughness as revealed by the notch impact test. Microexaminations of the as-deposited weld structure show some regions of carbide especially in the upper weld layer in a multilayer deposit. Residual carbide limits ductility and toughness in the weld and may be removed by heat treatment of the weld by heating at about 1650° F. to about 1850° F. for about one to two hours followed by a slow cool to about 1275° F. and an air cool to ambient temperature. Such a heat treatment does not damage the mechanical properties of the weld but increases tensile ductility and Charpy V-Notch impact toughness. Such a heat treatment is consistent with the development of best combinations of properties not only in the weld but also in nickel-containing austenitic ductile iron since such materials develop best properties when the structures are essentially free of carbide. It is found that the spheroidal graphite occurring in the weld deposit is well dispered and that individual graphite particles are fine. Reference to FIGURES 1 and 2 of the drawing clearly demonstrates the foregoing. FIGURE 1 depicts the as-welded structure of a weld produced in accordance with the invention while FIGURE 2 illustrates the structure of a portion of the same weld which had been subjected to an anneal at 1650° F. for one hour followed by a furnace cool.

In order to give those skilled in the art a better understanding and appreciation of the advantages of the invention, the following illustrative examples are given.

EXAMPLE I

An electrode core wire 5⁄32 inch in diameter containing about 19.6% nickel, about 0.2% manganese, about 0.006% calcium, about 0.03% silicon, about 0.013% carbon, about 0.005% phosphorus, about 0.013% sulfur, and the balance essentially iron, was prepared by melting, casting to an ingot, forging, and hot and cold working. No difficulties were experienced in forging, hot working or cold working the material. Straightened cut lengths of the wire were centerless ground and coated with a flux composition containing, by weight, about 15% calcium carbonate (minus 325 mesh), about 29% calcium carbonate (150 mesh), about 23% calcium fluoride, about 20% of a powdered nickel-magnesium alloy containing about 15% magnesium, about 10% granular carbon, and about 3% bentonite. The flux mixture was thoroughly blended and moistened with 15%, by weight, of a water solution containing sodium silicate. The moistened flux coating was applied to the coated wire by extrusion whereupon the flux-coated material was dried and baked. A weld test block about 3 inches by 6 inches by 1 inch thick made of an austenitic ductile iron composition containing about 2.63% carbon, about 2.6% silicon, about 1.28% manganese, about 19.89% nickel, about 2.37% chromium, about 0.033% magnesium, about 0.024% phosphorus, about 0.014% sulfur, and the balance essentially iron was prepared. A U-groove about 1⅝ long at the bottom and about 1⅝ inches wide at the top and having 30° inwardly sloping sides was milled in the block. The U-groove in the block was filled with weld metal employing the electrode described hereinbefore. Weld interpass temperatures was held below 200° F. After each pass, the bead surfaces and exposed heat-affected regions of the casting were examined at 15 diameters but no evidence of unsoundness or cracking was observed. After welding, the specimen was sectioned in half transversely to the weld bead length and one half was annealed by heating at 1650° F. for one hour followed by furnace cooling to 1275° F., a hold for five hours at 1275° F., and air cooling while the other half was left in the as-welded condition. Hardness measurements on the weld cross sections were determined with the results tabulated in the following Table V.

TABLE V

|  | As-Welded, Rockwell B | | | Ferritize-Annealed, Rockwell B | | |
|---|---|---|---|---|---|---|
|  | Average | High | Low | Average | High | Low |
| Weld metal | 96.7 | 105 | 91 | 80.5 | 86 | 76 |
| Casting | 85 | 87 | 82 | 81.6 | 83 | 79 |

The hardness of the as-deposited weld was slightly higher than that of the casting but the hardness of the weld and the casting were practically identical after the anneal. The weld was analyzed and found to contain about 1.47% carbon, about 0.34% silicon, about 0.24% manganese, about 22.5% nickel, about 0.01% magnesium, about 0.007% phosphorus, about 0.002% sulfur, and the balance essentially iron. The weld contained spheroidal graphite, was sound and satisfactory. The test block, which had a groove as described by Schumbacher et al. in Welding Research Supplement, vol. XXI, February 1956, at page 91s provides severe restraint in the weld.

EXAMPLE II

Using the electrode prepared as described in Example I, butt welds were made between two austenitic ductile iron plates about 3 inches by 6 inches by ½ inch thick. Each plate was beveled about 45° along the 6 inch edge, butted together therealong and a full-penetration weld deposited in the 90° V between the plates using the procedures employed in conjunction with Example I. The plate contained about 2.6% carbon, about 1.92% silicon, about 1.2% manganese, about 20.75% nickel, about 1.88% chromium, about 0.062% magnesium, the balance essentially iron. The completed assembly was sectioned transverse to the weld, one half was annealed as described in Example I and the other half examined in the as-welded condition. Tensile test specimens having a diameter of about 0.252 inch and standard Charpy V-Notch impact test specimens were prepared transverse to the weld with the V-notch in the impact test specimens being centered in the weld and with the notch axis normal to the plate surface were machined from both halves of the weld. The results of these tests are set forth in the following Tables VI and VII, respectively.

TABLE VI

| Test condition | Ultimate tensile strength, p.s.i. | 0.2% Yield strength, p.s.i. | El., percent | R.A., percent | Fracture location |
|---|---|---|---|---|---|
| As-welded | 76,600 | 53,000 | 10 | 17 | Plate. |
| Ferritize-annealed | 70,400 | 31,100 | 20 | 21 | Do. |

NOTE.—The annealed base plate had an ultimate tensile strength of 66,600 p.s.i., an 0.2% yield strength of 35,000 p.s.i., an elongation of 15%, and a Charpy impact value of 10.5 foot-pounds at room temperature.

TABLE VII

| Test condition | Charpy V-Notch Impact Values, foot-pounds | |
|---|---|---|
| | Room temperature | Minus 320° F. |
| As-welded | 6.3 | 2.3 |
| Ferritize-annealed | 16.5 | 3.0 |

The results indicated a 100% joint efficiency in both the as-welded and annealed conditions. The results demonstrate that the notch toughness of the annealed weld exceeded that of the plate.

EXAMPLE III

An electrode containing in the flux composition 20%, by weight, of rare earth oxides, a total of 39% calcium carbonate and 9% calcium fluoride, with the remainder of the electrode composition being that of Example I was prepared. A butt weld was produced between two plates of austenitic ductile iron in the same manner as that described in conjunction with Example II. The ductile iron composition was substantially that of the plate specimens described in Example II except that it contained no chromium, the nickel content was about 23.4% and the manganese content was 3.97%. The plate represents a grade of austenitic ductile iron intended for cryogenic applications. Again, the completed weld assembly was sectioned transverse to the weld. One portion was annealed at 1800° F. for two hours, furnace cooled at 1275° F. and held for five hours and then air cooled. Tensile and impact values were obtained upon all weld metal specimens in the annealed condition. The impact toughness of the as-welded material was also obtained. The results are set forth in the following Tables VIII and IX.

TABLE VIII

| Test condition | Ultimate tensile strength, p.s.i. | 0.2% yield strength, p.s.i. | El., percent | R.A., percent |
|---|---|---|---|---|
| Ferritize-annealed | 80,300 | 27,100 | 27 | 28 |

TABLE IX

| Test condition | Charpy V-Notch Impact Values, foot-pounds | |
|---|---|---|
| | Room temperature | Minus 320° F. |
| As-welded | 8.0–10.5 | 4.5–5.5 |
| Ferritize-annealed | 19.0–21.8 | 7.0–8.0 |

The tensile test results shown were obtained at room temperature and, as indicated, impact values were obtained at room temperature and at minus 320° F. The results set forth in the foregoing Tables VIII and IX demonstrates that significant improvements in ductility and in notch toughness were obtained by employing the 1800° F. annealing temperature, and by employing chromium-free plate.

EXAMPLE IV

A series of coated electrodes were prepared from wires containing, respectively, 19.6% nickel, 24.6% nickel, 29.4% nickel, 34.7% nickel and 38.2% nickel with the rest of the composition in each case being substantially that shown for the core wire in Example I. Each of the wires was coated with a flux composition similar to that given in Example I. U-groove weld tests were conducted using the specimen described in conjunction with Example I made of austenitic ductile iron containing about 20% nickel. In each case, the weld was found to be sound and free from cracks. In each case, the weld was sectioned and one half was annealed using the annealing cycle described in conjunction with Example I. Hardness measurements were made on the welds in the as-welded and annealed conditions with the results set forth in the following Table X.

TABLE X

| Core wire, percent nickel | As-welded, Rockwell B | | | Ferritize-annealed, Rockwell B | | |
|---|---|---|---|---|---|---|
| | Average | High | Low | Average | High | Low |
| 19.6 | 96.7 | 105 | 91 | 80.5 | 86 | 76 |
| 24.6 | 96.4 | 106 | 91 | 78.4 | 84 | 75 |
| 29.4 | 89.6 | 101 | 88 | 80.7 | 84 | 78 |
| 34.7 | 90.3 | 104 | 90 | 82.1 | 85 | 78 |
| 38.2 | 83.7 | 87 | 82 | 82.3 | 89 | 77 |
| Plate¹ | 85 | 87 | 82 | 81.6 | 83 | 79 |

¹ Values from non-heat affected zone.

The welds all contained spheroidal graphite and had the compositions as set forth in the following Table XI.

TABLE XI

| Core wire, percent nickel | Percent Fe | Percent Ni | Percent Mn | Percent Ca | Percent Si | Percent C | Percent P | Percent S | Percent Mg |
|---|---|---|---|---|---|---|---|---|---|
| 19.6 | Bal. | 22.5 | 0.24 | <0.01 | 0.34 | 1.47 | 0.007 | 0.002 | <0.01 |
| 24.6 | Bal. | 26.7 | 0.27 | <0.01 | 0.40 | 1.74 | 0.008 | 0.002 | <0.01 |
| 29.4 | Bal. | 30.5 | 0.28 | <0.01 | 0.38 | 1.63 | 0.005 | 0.002 | <0.01 |
| 34.7 | Bal. | 34.7 | 0.29 | 0.011 | 0.35 | 1.56 | 0.005 | 0.002 | <0.01 |
| 38.2 | Bal. | 38.1 | 0.27 | 0.010 | 0.30 | 1.56 | 0.004 | 0.002 | <0.01 |

The special welding materials provided in accordance with the invention cannot only be employed for the purpose of joining castings made of austenitic ductile iron but also can be used to join such castings to other metals, including carbon steels, low alloy steels, austenitic stainless steel, and nickel-base alloys. In addition, the special welding materials provided in accordance with the invention can be employed for the purpose of producing overlays of an austenitic ductile iron composition upon other alloys, including nickel-chromium alloys, e.g., an alloy containing about 7% iron, about 16% chromium and the balance essentially nickel, carbon steels and other common structural metals. Experience in overlaying dissimilar metals has demonstrated a surprising tolerance for dilution by dissimilar metals in weld deposits produced in accordance with concepts of the invention.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In an arc-welding electrode consisting of a metallic member and a flux, the improvement wherein said metallic member consists of a malleable iron-nickel alloy of about 18% to about 40% nickel, up to about 2.5% manganese, up to about 5.5% chromium, up to about 1% silicon, up to about 5% copper, up to about 0.2% carbon, and the balance essentially iron, and the said flux comprises about 20% to about 40%, by weight, of said electrode with said flux comprising a mixture of powdered ingredients including flux-forming and slag-forming ingredients with at least 5%, by weight, of said flux being a fluoride, about 5% to about 20% carbon, about 1.5% to about 3.5% magnesium, up to about 30% of rare earth oxides and up to about 25% of a binder.

2. A flux-covered arc welding electrode having a core wire containing about 19% to about 22% nickel and about 0.15% to about 0.3% manganese with the balance essentially iron, a flux comprising about 20% to 40%, by weight, of said electrode with said flux comprising a mixture of powdered ingredients including flux forming and slag forming ingredients with at least 5%, by weight, of said flux being a fluoride, about 5% to about 20% carbon, about 1.5% to about 3.5% magnesium, up to about 30% of rare earth oxides and up to about 25% of a binder.

3. A flux covered arc welding electrode having a core wire containing about 20% nickel, about 0.2% manganese, about 0.05% carbon, about 0.02% calcium, and the balance essentially iron, a flux comprising about 20% to about 40%, by weight, of said electrode with said flux comprising a mixture of powdered ingredients including flux forming and slag forming ingredients with at least 5% by weight, of said flux being a fluoride, about 5% to about 20% carbon, about 1.5% to about 3.5% magnesium, up to about 30% of rare earth oxides and up to about 25% of a binder.

4. An arc-welding electrode in accordance with claim 1 having a flux covering containing, in percent by weight of said flux, about 30% to 70% calcium carbonate, up to about 30% cryolite, and up to about 40% calcium fluoride.

5. An arc-welding electrode in accordance with claim 4 having a flux covering containing in percent by weight of said flux, about 44% calcium carbonate, about 23% calcium fluoride, and about 10% carbon.

6. An arc-welding electrode in accordance with claim 1 wherein magnesium is present in the flux as a powdered alloy from the group consisting of nickel-magnesium alloys containing about 2% to about 50% magnesium, and copper-magnesium and cerium-magnesium alloys containing about 25% to about 50% magnesium.

7. An arc-welding electrode in accordance with claim 6 wherein the nickel-magnesium alloy contains about 15% magnesium.

References Cited

UNITED STATES PATENTS

| | | | |
|---|---|---|---|
| 2,900,490 | 8/1959 | Petryck | 219—137 |
| 3,184,577 | 5/1965 | Witherell | 219—145 |
| 3,253,950 | 5/1966 | Wasserman et al. | 117—206 |

JOSEPH V. TRUHE, Primary Examiner

B. A. STEIN, Assistant Examiner

U.S. Cl. X.R.

117—206